(12) United States Patent
Kassler

(10) Patent No.: US 11,485,445 B2
(45) Date of Patent: Nov. 1, 2022

(54) CLUTCH PULL REDUCTION ASSEMBLY

(71) Applicant: Jesse Kassler, Lakeland, FL (US)

(72) Inventor: Jesse Kassler, Lakeland, FL (US)

( * ) Notice: Subject to any disclaimer, the term of this patent is extended or adjusted under 35 U.S.C. 154(b) by 0 days.

(21) Appl. No.: 17/366,784

(22) Filed: Jul. 2, 2021

(65) Prior Publication Data

US 2022/0081060 A1 Mar. 17, 2022

Related U.S. Application Data

(60) Provisional application No. 63/078,071, filed on Sep. 14, 2020.

(51) Int. Cl.
*B62K 23/06* (2006.01)
(52) U.S. Cl.
CPC .................................... *B62K 23/06* (2013.01)
(58) Field of Classification Search
None
See application file for complete search history.

(56) References Cited

U.S. PATENT DOCUMENTS 6,098,488 A * 8/2000 Vos ........................... B62L 3/02
74/489
6,112,614 A * 9/2000 Yamashita ................ B62L 3/02
74/489

* cited by examiner

*Primary Examiner* — Vicky A Johnson
(74) *Attorney, Agent, or Firm* — Cynthia S. Lamon; Lamon Patent Services

(57) ABSTRACT

A force reducing apparatus includes a housing and cover plate, a pair of fixed anchor plates disposed to the housing and underside of the cover plate, a pivot plate assembly including a first pair pivot plates and a second pair of pivot plates connected to a fixed pair of anchor plates, the first pair of pivot plates connected to a first cable routed through the housing sidewall and connected to a clutch lever, the second pair of pivot plates connected to a second cable routed through the sidewall of the housing and connected to a clutch actuator at a clutch assembly, and a pair of idler plates connected to the pivot plates at the unanchored ends of the pivot plates. An operator pulls the first pair of pivot plates via the clutch lever to operate the plate assembly reducing the amount of force needed to release an engaged clutch.

11 Claims, 12 Drawing Sheets

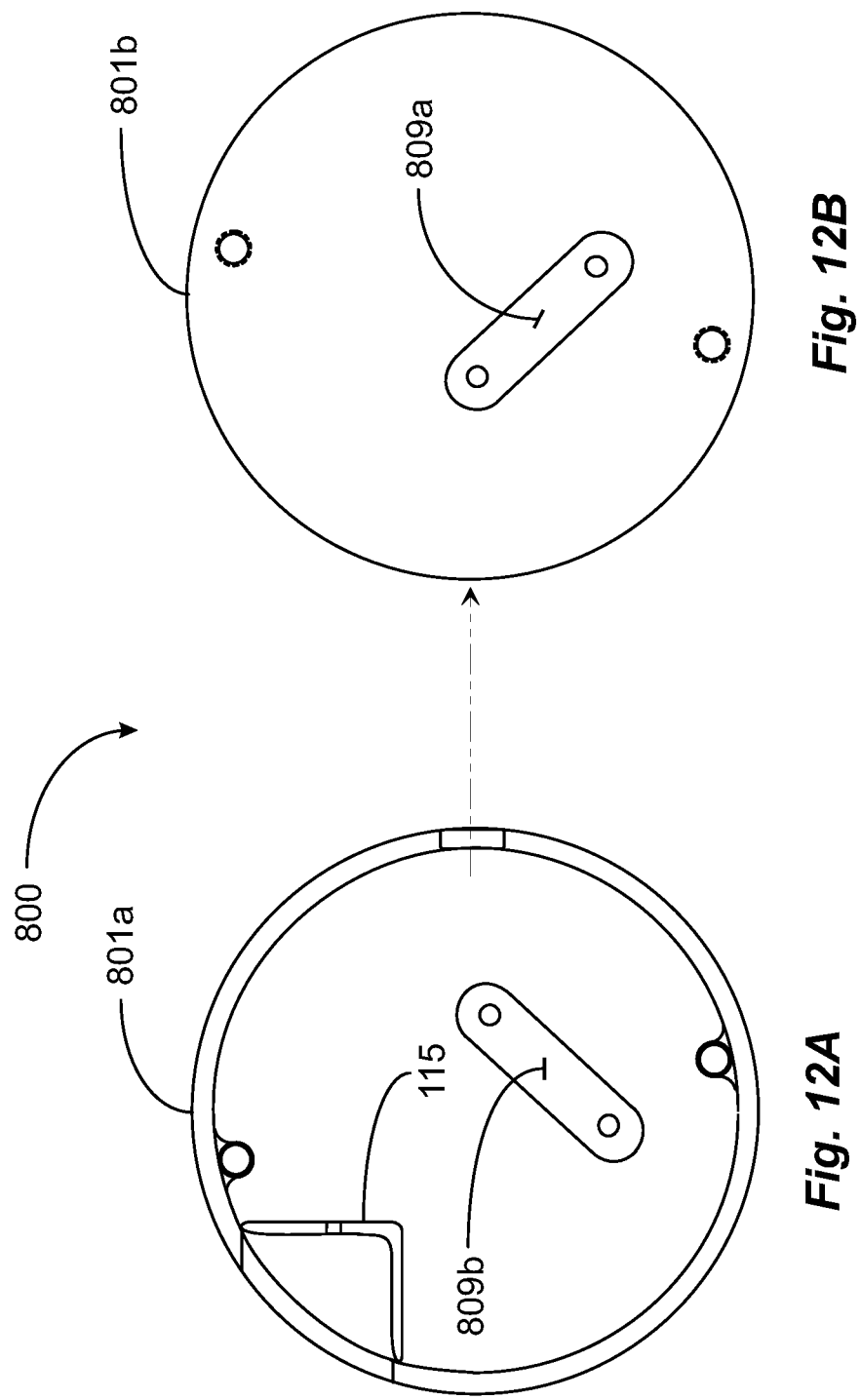

CLUTCH PULL REDUCTION ASSEMBLY

CROSS-REFERENCE TO RELATED DOCUMENTS

The present application claims priority to U.S. provisional application 63/078,071, filed Sep. 14, 2020. All disclosure of the parent applications is incorporated herein at least by reference.

BACKGROUND OF THE INVENTION

1. Field of the Invention

The present invention is in the field of cable pulley clutch levers for any vehicles that use hand operated clutches. Specifically, these vehicles may include motorcycles and all-terrain vehicles (ATV) and the invention pertains particularly to methods and apparatus for reducing the pull force required to operate a clutch lever.

2. Discussion of the State of the Art

Clutch-operated motorcycles and all-terrain vehicles (ATM) have clutches connected to gear boxes for enabling a rider to change gears. Some models have foot operated clutches and gear selectors. Other models have cable operated clutches that use a clutch lever typically mounted on the left handlebar of a motorcycle or an ATV. Typical motorcycle and ATV clutches are friction clutches and include an outer clutch basket or housing driven by a crank shaft. An inner clutch hub fits into a clutch basket and both are connected to an input shaft of a gear box.

A clutch pack containing friction plates and disc plates stacked in alternate order fits into the hub and basket. The friction plates have teeth locking to slots in the outer basket while the steel plates there between have inner teeth that lock to grooves in the inner hub. A clutch pressure plate is installed over the clutch pack to apply pressure to the clutch pack compressing the friction and steel plates together, the pressure plate typically including four to six springs in mounting (one spring per bolt) to put equal pressure (several hundred pounds psi) against the clutch pack causing engagement of the clutch assembly by default.

A cable operated by a clutch lever on the left handlebar of the motorcycle or ATV may be used to disengage the clutch plate releasing the clutch hub from the clutch basket. The process engages a push rod actuator which is machined to act against a push rod toward the clutch assembly to push out the clutch plate against spring tension to disengage the clutch. The clutch lever when depressed disengages the clutch and when released engages the clutch.

Clutches in the current art are of a smaller diameter with a larger number of clutch friction plates and clutch steel plates so the clutch assembly is smaller in diameter but much deeper providing the frictional surface area to fully engage the clutch inner hub and outer basket as a single unit. Typically, a rider grips the lever of the handlebar and the clutch lever in a same grip movement to disengage the clutch to switch gears. The force required to grip and compress the clutch lever may be significant (varying between models) and repetitive operation of a clutch lever may cause strain and even injury to a rider. The difficulty in operating the clutch lever may be different from model to model of motorcycle and ATM due to different frictional pressure ratings of the clutch assembly and whether the assembly is assisted hydraulically or not.

Therefore, what is clearly needed is a clutch lever resistance reducing mechanism that may reduce the amount of force a motorcycle or ATM rider is required to exert when gripping and contracting the clutch lever to the handlebar grip.

BRIEF SUMMARY OF THE INVENTION

According to an embodiment of the present invention, a clutch actuation force reducing apparatus is provided including an annular housing having a bottom wall, a sidewall, and a depth, the housing open at one end, an annular cover plate having a diameter and a plate thickness, the cover plate adapted to close the open end of the housing, a pair of anchor plates having a uniform length, a uniform width, and a uniform plate thickness, one anchor plate fixed to the bottom wall of the housing, the remaining anchor plate fixed to the underside of the cover plate, the anchor plates positionally aligned upon assembly of the cover plate to the housing, a pivot plate assembly including a first pair pivot plates and a second pair of pivot plates, the pivot plates having a uniform length, a uniform width, and a uniform plate thickness, the first pair of pivot plates connected to pivot to one end of the pair of anchor plates, the first pair of pivot plates having a cable connection to a first cable routed through the sidewall of the annular housing and connected to a clutch lever, the second pair of pivot plates connected to pivot to the remaining end of the pair of anchor plates, the second pair of pivot plates having a cable connection to a second cable routed through the sidewall of the annular housing and connected to a clutch actuator in turn connected to a clutch plate of a clutch basket assembly, and a pair of idler plates having a uniform length, a uniform width, and a uniform plate thickness, the idler plates connected to the first and second pair of pivot plates at the unanchored ends of the pivot plates, the idler plates adapted to control pivot motion of the first and second pair of pivot plates. An operator may urge the clutch lever down to a handle grip to pull the first pair of pivot plates to initiate pivoting thereof about the connection at the pair of anchor plates, the pull force translated to the second pair of pivot plates over the pair of idler plates and dividing the stock pull force over the two pivot points at the pair of anchor plates to reduce the amount of physical force required at the clutch lever to actuate disengagement of an engaged clutch assembly.

In one embodiment, the pivot points at the pair of anchor plates are vertical pins extending orthogonally through the anchor plates and through first and second pair of pivot plates respectively and retaining the pivot plates in an aligned stack at respective ends, the anchor plates sandwiching the ends of the first and second pair of pivot plates. In one embodiment, the pivot points at the pair of idler plates are vertical pins extending orthogonally through the idler plates and through the first and second pair of pivot plates respectively and retaining the pivot plates in an aligned stack at respective ends, the idler plates sandwiching the ends of the first and second pair of pivot plates.

In one embodiment, the first and second pair of pivot plates exhibit a hook feature on one side, the hook feature used to retain cylindrical cable ends of the first and second cables. In the embodiment using pins, the pins are retained in the pivot plate assembly at the cable interfacing ends of the pivot plate stacks with circle clips at least at the top end of the pins. In this embodiment, the pins are retained in the plate assembly at the anchor plates by the bottom of the housing and the underside of the cover plate. In a preferred embodiment, the clutch actuation force reducing apparatus is mounted to the left handlebar of a motorcycle or of an all-terrain vehicle (ATV). In one embodiment, the cover plate is installed onto the housing with machine screws.

In the embodiment using pins, the first and second pair of pivot plates are spaced apart at the pivot points with a pair of annular spacers placed over the pins. In a variation of this embodiment, the first and second cable connections to the first and second pair of pivot plates respectively are annular rings having an outside diameter and an inside diameter and a ring thickness, the rings connected in between each pair and over the vertical pins. In one embodiment, the motorcycle is one of a Japanese model or one of an American model wherein specific components of the apparatus are modified to adapt to the Japanese model or the American model. In a variation of this embodiment, the American model is a Harley Davidson™ model, and the Japanese model is one of a Kawasaki™ model a Suzuki™ model, or a Yamaha™ model. In one embodiment, the anchor plates are fixed by welding them to the housing bottom wall and to the underside of the cover plate. In one embodiment, actuation of the clutch assembly is accomplished using a push rod to displace a clutch plate from a clutch basket.

BRIEF DESCRIPTION OF THE SEVERAL VIEWS OF THE DRAWINGS

FIG. 12A is an elevation view of the housing of the clutch assistant apparatus of FIG. 8.

FIG. 12B is an elevation view of the underside of the cover plate of the clutch assistant apparatus of FIG. 8.

DETAILED DESCRIPTION OF THE INVENTION

In various embodiments described in enabling detail herein, the inventor provides a unique force reduction apparatus for reducing the force required to depress a handlebar clutch lever to release a clutch assembly of a motorcycle or an all-terrain vehicle (ATV). A goal of the present invention is to provide an intermediate clutch assistant (force reduction apparatus) between a clutch lever and clutch assembly in a motorcycle or ATV. Another goal of the invention is to provide a clutch assistant force reduction apparatus that may be adapted to a wide variety of motorcycle and ATV models. The present invention is described using the following examples, which may describe more than one relevant embodiment falling within the scope of the invention.

Figure 1:
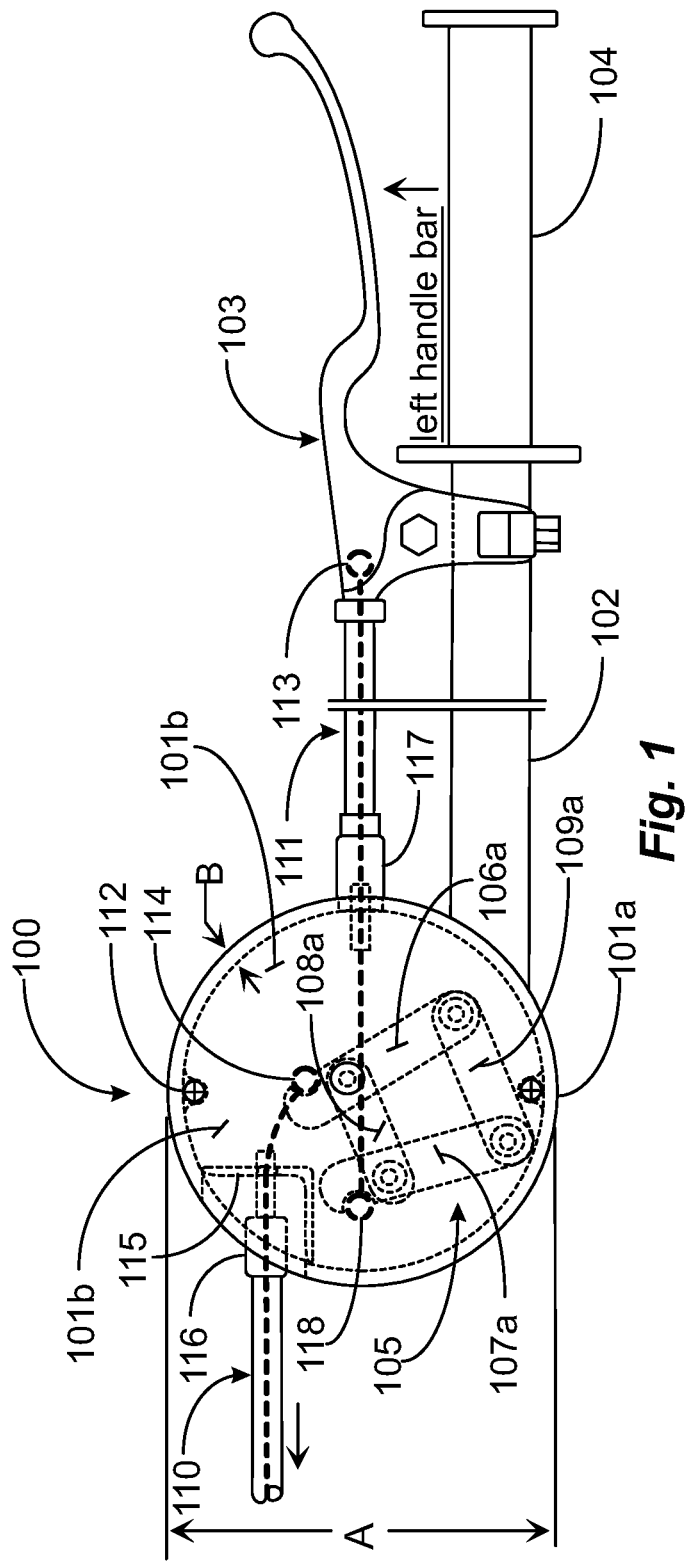
FIG. 1 is an elevation view of a clutch lever adapted with a pressure reducing clutch assistant apparatus according to an embodiment of the invention.

FIG. 1 is an elevation view of a clutch lever adapted with a pressure reducing clutch assistant apparatus 100 according to an embodiment of the invention. Clutch assistant apparatus 100 is adapted as an intermediary interface disposed between a cable-assisted clutch on a motorcycle or an all-terrain vehicle and a handlebar clutch lever referenced herein as a clutch lever 103 mounted to a left handlebar 102 of a motorcycle or an ATV just ahead of a handlebar grip 104. Apparatus 100 may be referred to in this specification as clutch assistant 100. Clutch assistant 100 includes a housing 101a in the form of an annular cup including a bottom plate and a sidewall closed on the top thereof by an annular disc cover plate 101b that may be removed and replaced using typical screw hardware referenced herein as screws 112 (two each). Screws 112 may be M4-70 machine screws about one inch long in this example.

Clutch assistant 100 is, in this embodiment, mounted onto handlebar 102 about 14 inches ahead of mounted clutch lever 103. The perspective of this view is from in front of the motorcycle or ATV. The face of clutch assistant 100 (cover plate 101b) faces generally forward relative to the orientation of the motorcycle or ATV and may be adjusted in mounting to handlebar 102 relative to the orientation of the clutch assistant with the orientation of clutch lever 103 without departing from the spirit and scope of the present invention. The orientation of both components in this view is suggestive only for the purposes of illustration.

Clutch assistant housing 101a and cover plate 101b may be fabricated of aluminum, steel, or another durable metal. The sidewall of housing 101a may have a uniform thickness B of one eighth of an inch to one quarter of an inch approximate. The depth of clutch assistant housing 101a may be about one inch in depth to provide clearance for the operation of the clutch assistant in reducing the force required to depress clutch lever 103. Clutch assistant housing 101a has a major diameter A of about four inches in this example but may be larger or smaller without departing from the spirit and scope of the present invention.

Clutch assistant 100 has two opposing cable interfaces for cable attachment. A primary cable 111 connects to clutch lever 103 via a cable end 113 as is typical for cable attachments. Cable 111 and handlebar 102 are depicted as broken to illustrate longer length of actual parts. Primary cable 111 may be routed through the sidewall of clutch assistant housing 101a and may be connected to a force reduction mechanism 105 installed within clutch assistant 100. Force reduction mechanism 105 comprises a plurality of elongate pivot plates referenced herein as pivot plates 107a and 107b (107b not visible) and pivot plates 106a and 106b (106b not visible) mounted in stacked pairs over spatially arranged pivot pins and secured in stack by two idler plates 108a and 108b (108b not visible). The pivot assembly is anchored to a stack of anchor plates 109a and 109b (109b not visible) that are fixed in a stack, one anchor plate (109b not visible) fixed to the bottom of clutch assistant housing 101a and the other anchor plate 109a fixed to the underside of cover plate 101b.

Pivot plates 107a, 107b, 106a and 106b (four plates in two stacks) may be the same interchangeable part having a length, a width, and a thickness dimension. In this embodiment, the stack of pivot plates represented by 107a may be referenced herein as primary plates or a primary plate stack due to a fact that primary cable 111 has connection to this stack via a cable end 118. The stack of pivot plates represented by element 106a may be referred to as a secondary stack or secondary pivot plates due to a fact that a secondary cable 110 leading to a clutch assembly on the motorcycle or ATV has connection to this stack of plates via a cable end 114.

Primary cable 111 may include a threaded stem and cable-position adjustment nut 117, the stem thereof threaded into an internally threaded opening placed through the sidewall of clutch assistant housing 101a. A cable bracket plate 115 is provided in this embodiment and may be welded or otherwise fixed to the inside wall of clutch assistant housing 101a. Bracket plate 115 may be a steel bracket, an aluminum bracket or a bracket made of some other alloy without departing from the spirit and scope of the present invention. In this embodiment, bracket plate 115 is a right-angle plate having an internally threaded opening placed there through for accepting a threaded stem and cable-position adjustment nut 116 of the secondary cable 110 leading to the clutch assembly of the motorcycle or ATV.

Idler plates 108a and 108b (108b not visible) hold the primary pivot plate stack (107ab) and the secondary pivot plate stack (106ab) together using pivot pins secured through the plates orthogonally. The pivot plate stacks may be pivotally anchored, using a pair of pins, at the opposite ends thereof to the anchor plate stack, which is positionally fixed within the clutch assistant housing/cover plate and holds the assembly 105 together in the housing 101a. and provides a pivot base (two pivot points) for both the primary and secondary pivot plate stacks.

In this view, clutch lever 103 is at rest and is not depressed. Secondary cable 110 carries spring tension translated from the pressure plate installed over the clutch stack nested within the clutch assembly. Secondary cable 110 has a spring tensioned cable attachment via a cable end 114 to a hook feature in the secondary pivot plate stack (106a,b). The amount of spring tension in cable 110 is proportional to the amount of pressure on the clutch pack at the clutch assembly, more particularly, the amount of force required to push or pull the clutch pressure plate to disengage the clutch assembly.

Assembly 105 functions to reduce the proportional amount of force required at the clutch lever 103 thereby reducing the amount of force an operator must exert to depress the clutch lever to release clutch engagement in the clutch assembly for smooth switching of gears. Depressing clutch lever 103 toward handlebar grip 104 acts to pivot the primary pivot plate stack 107a,b toward the handlebar grip 104 around the associated pivot point at the positionally fixed anchor plate stack 109a, b.

In general use, the operation causes idler arm plate stack 108a, b to pivot and push the secondary pivot plate stack 106a, b to also pivot about the correlative pivot point for that stack at fixed anchor plate stack 109a, b. The clutch lever force tension from primary cable 111 is translated through assembly 105 from primary pivot plate stack 107a, b through idler plate stack 108a, b to secondary pivot plate stack 106a, b wherein the idler stack 108a, b amplifies the force applied at the clutch lever 103 to an amount sufficient to disengage the clutch assembly without requiring the same resistive force to actuate the clutch assembly and disengage the pressure plate from the clutch assembly.

In this embodiment, the clutch lever 103 is not depressed and assembly 105 is at rest with tension from cable 110 pulling against secondary pivot plate stack 106 (a, b) rendering clutch assistant pivot plate assembly 105 positionally at rest. Clutch assistant 100 is adapted, in this embodiment, as an aftermarket product adapted for primarily Japanese motorcycle models including Yamaha™, Honda™, and Suzuki™ including ATV models Polaris™, and Bombardier™.

Figure 2A:
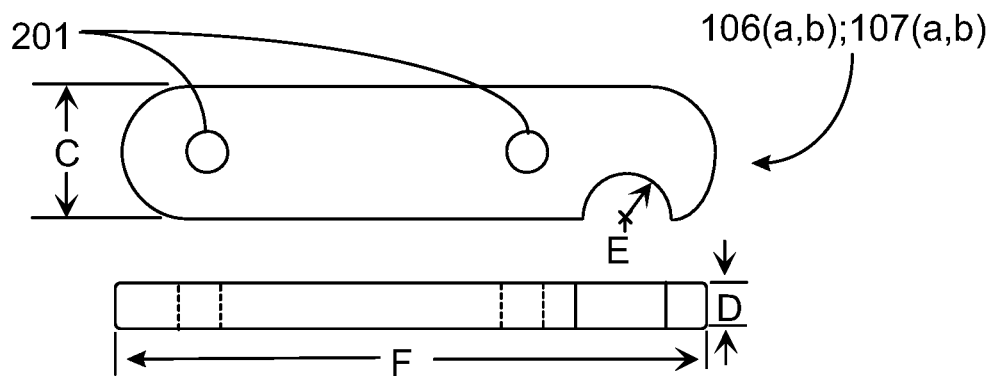
FIG. 2A is an overhead view and relative bottom edge view of the primary or secondary pivot plate of the clutch assistant apparatus of FIG. 1 according to an embodiment of the present invention.

FIG. 2A is an overhead view and relative bottom edge view of the primary or secondary pivot plate of the clutch assistant apparatus 100 of FIG. 1 according to an embodiment of the present invention. In this embodiment, the pivot plate is an interchangeable part between the primary or secondary plate stacks and may be plate 106 a, 106b, 107a, or 107b. A total of four pivot plates make up the primary and secondary pivot plate stacks. For purpose of discussion, the pivot plate will be referred to herein as pivot plate 107a.

Pivot plate 107a has an overall length F of about 1.8 inches (46 mm) and a plate thickness D of about 0.100 of an inch (2.5 mm). Pivot plate 107a has a width dimension C of approximately one-half inch (12.7 mm). Pivot plate 107a includes a hook feature having a radius E machined or stamped near the cable interfacing end of the plate. The hook feature is adapted to catch the annular cable end whereby the cable (typically steel) routs between the plates on a plate stack given the plates in a stack may be spaced apart using spacers.

Pivot plate 107a includes a pair of openings 201 spaced apart and arranged linearly along the longitudinal center line of the plate. Openings 201 have an internal diameter of about 165 thousandths of an inch (4.2 mm) just large enough to accept a pivot pin having a diameter of about 157 thousandths of an inch (4.0 mm) in outside diameter (OD). Pivot plate 107a is fully rounded at both ends. The spacing distance between openings 201 may be shy of one inch (24 mm) from center line to center line.

Figure 2B:
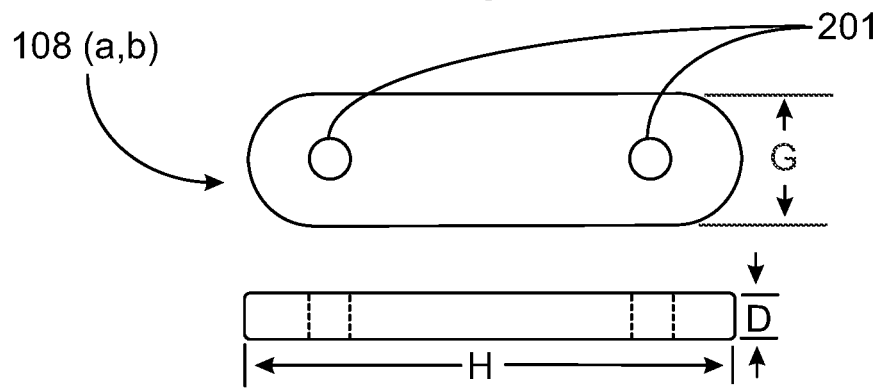
FIG. 2B is an overhead view and relative bottom edge view of an idler arm plate of the clutch assistant apparatus of FIG. 1.

FIG. 2B is an overhead view and relative bottom edge view of an idler arm plate of clutch assistant apparatus 100 of FIG. 1. In this embodiment, the idler arm plate is an interchangeable part in the idler stack including idler plate 108a (top) and 108b (bottom) the idler stack sandwiching the primary and secondary plate stacks and holding them positionally together. A total of two idler plates make up the idler plate stack. For purpose of discussion, the idler plate will be referred to herein as idler plate 108a.

Idler plate 108a may be a steel plate having an overall length H of about one and four hundred thousandths of an inch (36 mm) and a thickness D of 0.100 of an inch (2.7 mm). Idler arm plate may be fully rounded at both ends and includes a pair of openings 201 spaced apart linearly along the longitudinal center line of the idler plate at a dimension of about an inch (25.5 mm). Idler plate 108a may have a width dimension G just greater or just less than dimension C of FIG. 2A or about one-half inch.

Figure 2C:
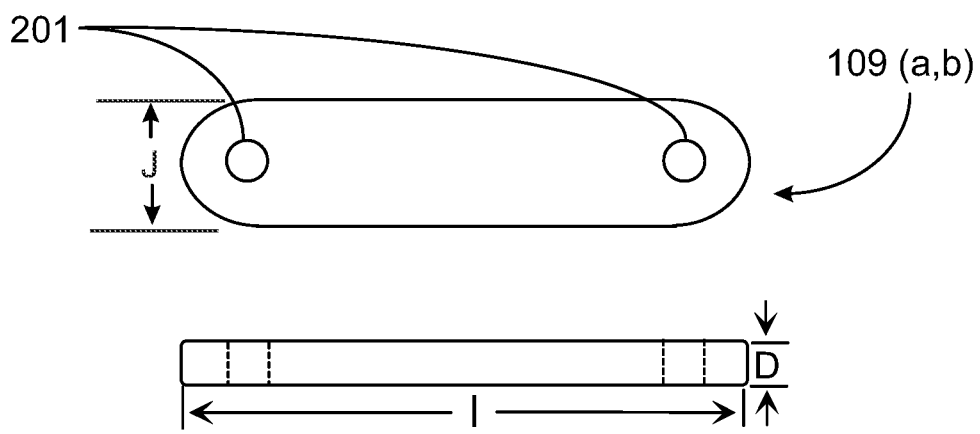
FIG. 2C is an overhead view and relative bottom edge view of the pivot anchor plate of the clutch assistant apparatus of FIG. 1.

FIG. 2C is an overhead view and relative bottom edge view of the pivot anchor plate of clutch assistant apparatus 100 of FIG. 1. In this embodiment, the pivot anchor plate is an interchangeable part in the anchor stack including anchor plate 109a (top plate fixed to plate cover) and 109b (bottom plate fixed to the bottom of clutch assistant housing 101a) the anchor plate stack sandwiching the primary and secondary pivot plate stacks and anchoring them positionally at two pivot points, one for each stack. A total of two anchor plates make up the anchor plate stack. For purpose of discussion, the anchor plate will be referred to herein as anchor plate 109a.

Anchor plate 109a has an overall length I of approximately one and three-quarters inches (45 mm). Anchor plate 109a has a thickness dimension D of about one-hundred thousandths of an inch (2.5 mm) same as the thickness dimension D for the other plates in plate assembly 105. Anchor plate 109a may be fully radiused at both ends. Anchor plate 109a includes a pair of openings 201 arranged linearly and spaced apart along the longitudinal center line of the plate. Openings 201 are spaced apart approximately one and three eights of an inch (34 mm) from center-line-to-centerline. Anchor plate 109a is fixed in position on the underside of the cover plate of the clutch assistant while anchor plate 109b is fixed to the bottom surface of the clutch assistant housing. When the cover is placed over the housing, anchor plates 109a and 109b come into a stack alignment like the other plates in assembly. Openings 201 in all of the plates align to accept four vertical pins, two of which hold the primary, secondary, and idler plates in stack and two of which provide assembly anchor to the fixed anchor plates.

Figure 3:
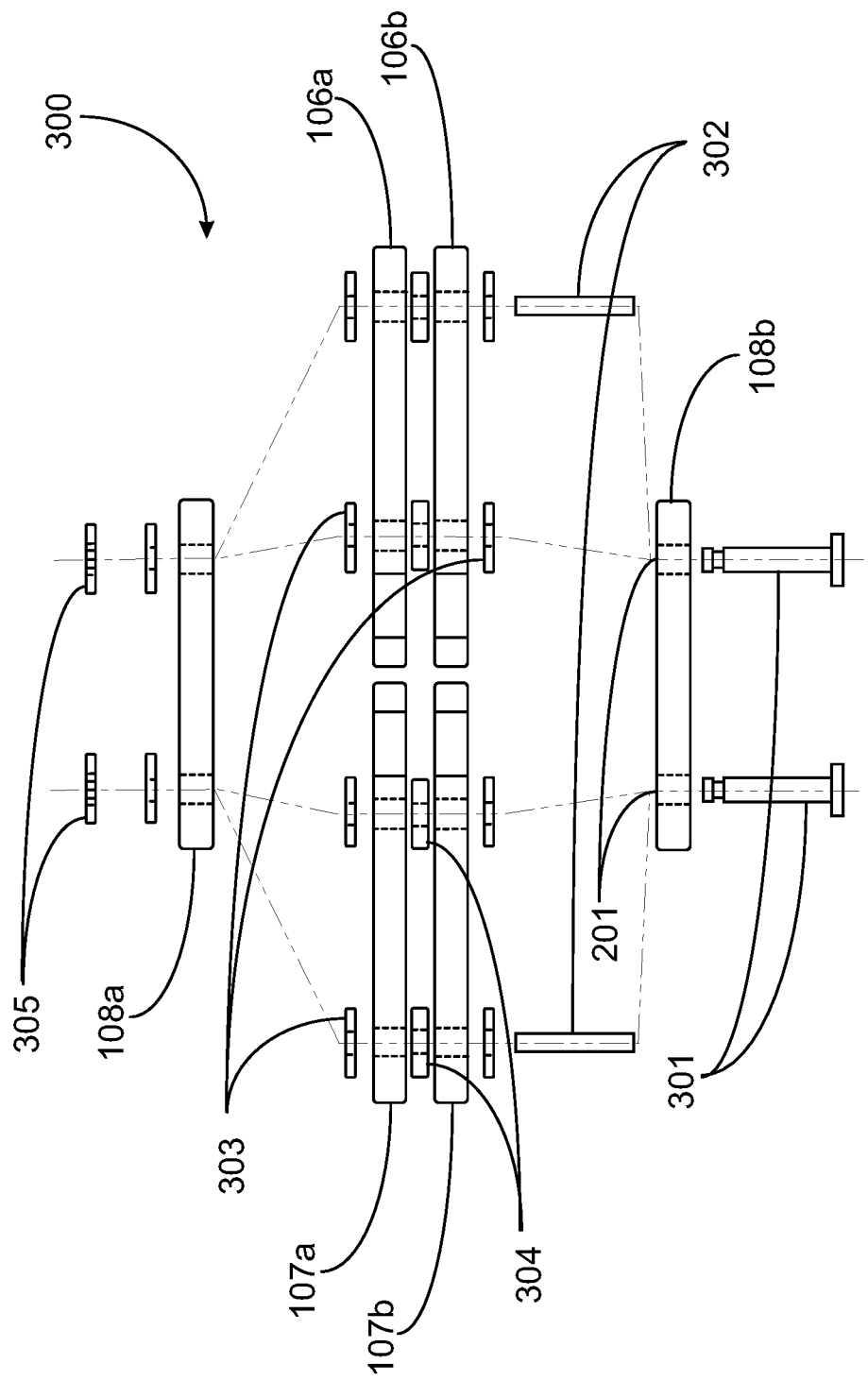
FIG. 3 is an exploded view of the arm pivoting portion of the plate assembly of the clutch assistant apparatus of FIG. 1.

FIG. 3 is an exploded view 300 of the pivoting portion of plate assembly 105 of clutch assistant apparatus 100 of FIG. 1. Exploded view 300 captures plate assembly 105 and anchor plates 109a and 109b introduced in FIG. 1 depicting the spatial arrangement of the plate components in the pivotal assembly. In this embodiment, a pair of pins 301 are provided for securing idler arms 108a and 108b over primary pivot plates 107a and 107b and secondary pivot plates 106a and 106b in assembly in a loose manner allowing for pivot of the idler arms while attached to the pivot plate stacks.

Pins 301 may be fabricated from steel or aluminum or some other durable metal. Pins 301 may have an overall length of about three-quarters of an inch long (20 mm). Pins 301 have a head at the bottom having a diameter larger than the diameters of holes 201 placed through the idler plates and primary and secondary plates. The shaft of pins 301 is just smaller in diameter than openings 201 for a loose fit. The pin shaft outside diameter is approximately five sixteenth of an inch (4 mm) while the diameter of holes 201 is approximately. 165 inches (4.2 mm).

The overall length of the shaft of pins 301 is approximately eleven-sixteenth of an inch (17.4 mm). The dimensioning of pins 301 provide loose-fit pivoting without binding and with no friction. Pins 301 include a pin groove proximal to the top end of about one-thirty-second of an inch (0.8 mm) wide extending around the pin shaft. Pins 301 extend through holes 201 in the idler arm plates and the holes near the hook features of the primary and secondary pivot plates.

Annular washers or shims 303 are provided (10 each) to prevent the plates from any frictional contact. The washers or shims 303 are adapted to fit over pins 301. Washers/Shims 303 have and outside diameter of about nineteen and sixty fourth of an inch (7.6 mm), an inside diameter of approximately five-sixteenth of an inch (4.2 mm), and a thickness of about three sixty fourths of an inch (0.5 mm). Primary pivot plates 107a and 107b, and secondary pivot plates 106a and 106b are spaced apart in stack assembly with annular spacers 304. Spacers 304 may be steel spacers and may be approximately twenty-five sixty fourths (10 mm) in outside diameter, about thirteen-sixty fourths (5.2 mm) inside diameter, and about three-thirty-seconds of an inch (2.4 mm) thick.

Pins 301 may be inserted from bottom up through the components including shims and spacers and cir-clips (retainer clips) 305 (2 each) are provided to lock the assembly. Cir-clips have an outside diameter of about five sixteenth of an inch (8 mm), and a thickness of about one-sixty-fourth of an inch (0.5 mm). Two additional pins 302 are provided to anchor the lower ends of the primary pivot plate stack and secondary pivot plate stack to the anchor plates (not illustrated in this example). Pins 302 may be steel pins thirteen-sixteenth of an inch (21 mm), The outside diameter of pin 302 is identical in this embodiment to that of Pin 301 or about five sixteenth of an inch (4 mm).

One with reasonable skill in the art will understand that dimensioning of hardware used in this embodiment may vary from model to model without departing from the spirit and scope of the present invention, for example, different dimensioning relative to different models or versions of motorcycle or ATV that a clutch assistant may be adapted for. It may also be apparent to one with skill in the art that other hardware components not specified herein might be substituted therefor, for example, bearings, straight pins, retainer clips, or the like without departing from the spirit and scope of the present invention.

Figure 4:
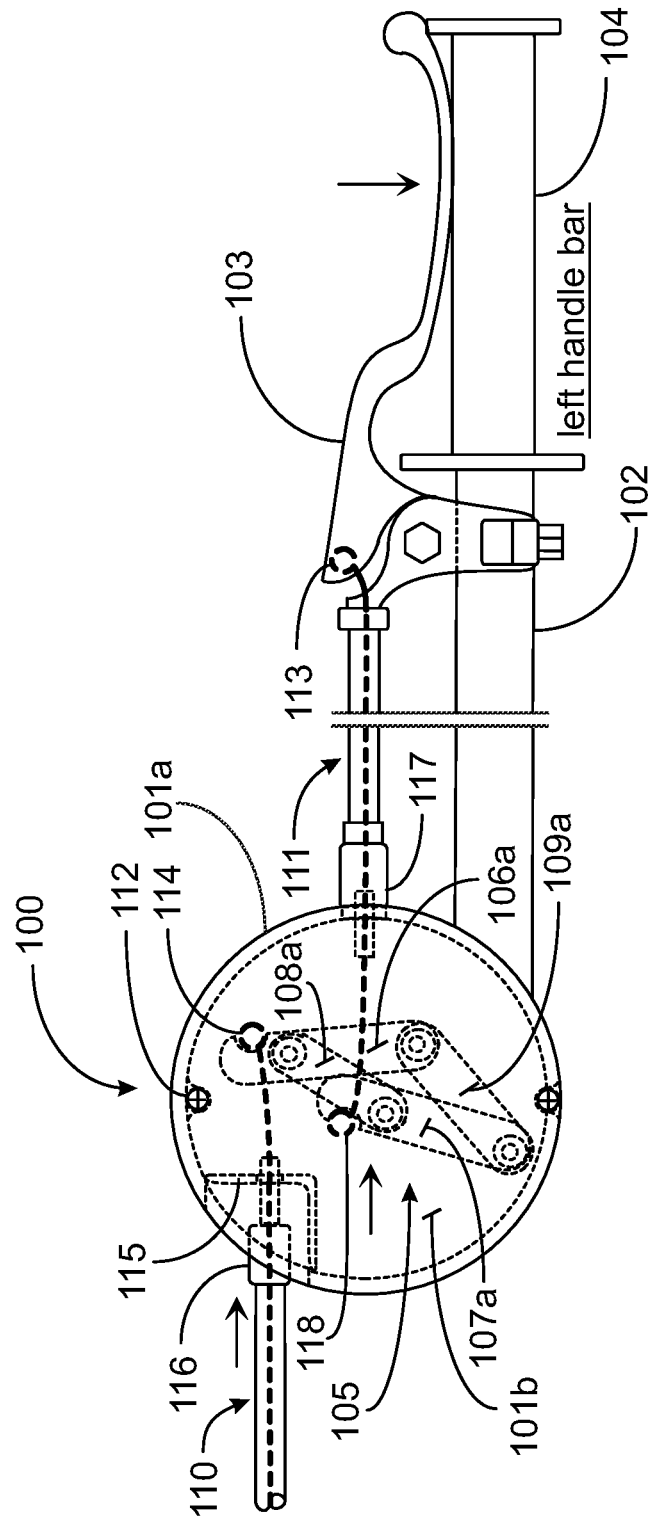
FIG. 4 is an elevation view of the clutch lever adapted with the pressure reducing clutch assistant apparatus of FIG. 1 in a clutch release position.

FIG. 4 is an elevation view of clutch lever 103 adapted with the pressure reducing clutch assistant apparatus 100 of FIG. 1 in a clutch release position. Referring now back to FIG. 1, clutch assistant 100 is resting in an idle state, the plate stack assembly 105 at rest within housing 101a. In this state, the clutch assembly on the motorcycle or ATV is by default engaged. The operator must physically depress clutch lever 103 to disengage the clutch assembly by displacing a clutch pressure plate against the spring tension through a typical actuator as described further above.

Referring now to FIG. 4, clutch assistant 100 is placed in a state of full disengagement of the clutch assembly through the operator depressing clutch lever 103 according to the direction of the arrow. Depressing lever 103 operates primary cable 111 to pull the primary pivot plate stack (107 a, b) toward the lever side about the pivot pin (302) anchoring the stack to the plate anchor stack (109 a, b). This forces the idler stack (108 a, b) to pivot and to urge the secondary pivot plate stack (106 a, b) toward clutch lever 103 pulling the secondary cable 110 toward left handlebar grip 104 with sufficient force to actuate clutch release at the clutch assembly. The force required to operate an actuator (rod) to push or pull a clutch plate out from a clutch assembly on the motorcycle or ATV is divided within clutch assistant 100 among the four pivot points characterized in plate assembly 105. Therefore, the force the operator must exert at lever 103 to disengage the clutch assembly is reduced from what it would be over a standard direct cable connection omitting the clutch assistant and primary cable.

Figure 5:
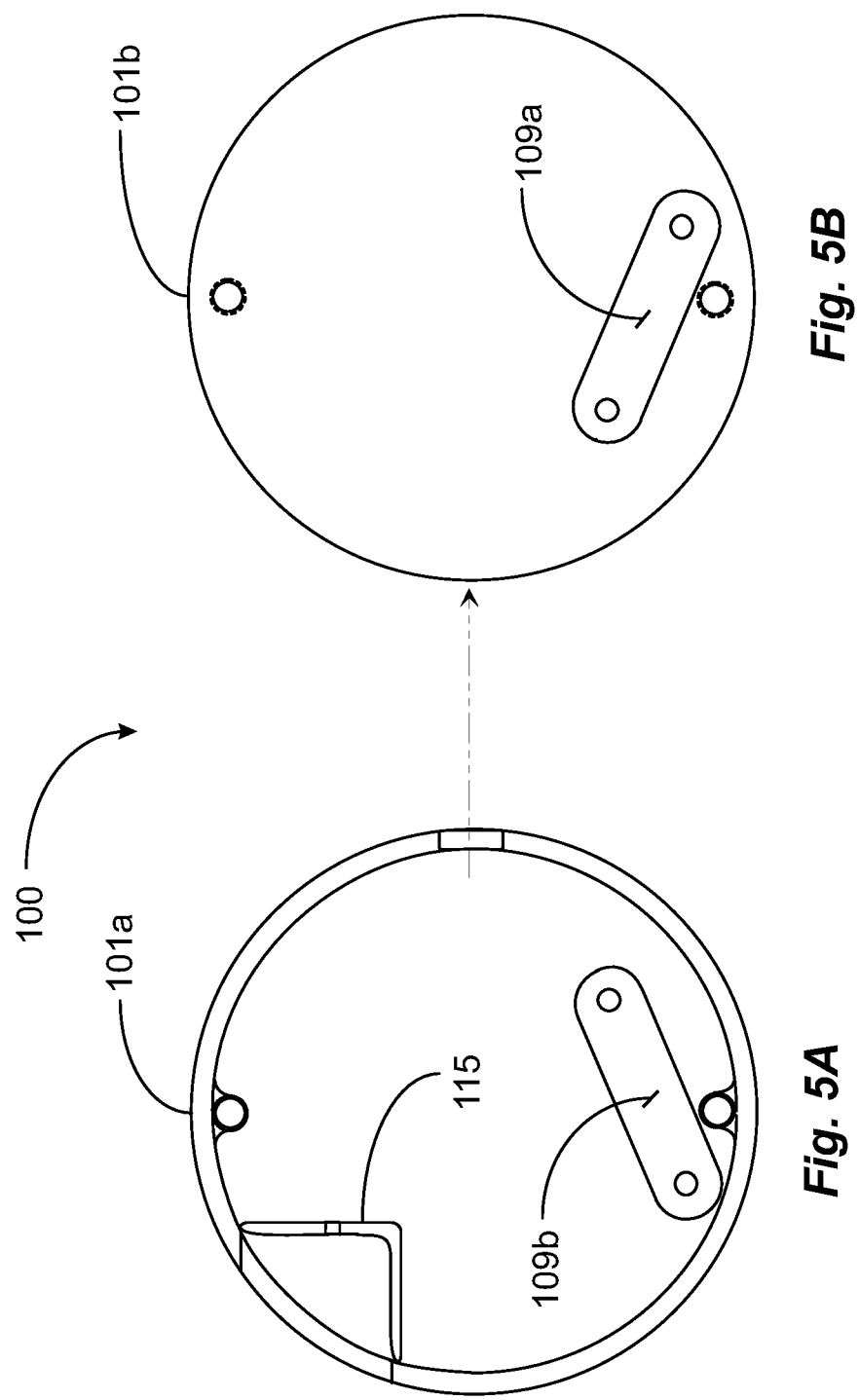
FIG. 5A is an elevation view of the housing of the clutch assistant apparatus of FIG. 1.
FIG. 5B is an elevation view of the underside of the cover plate of the clutch assistant apparatus of FIG. 1.

FIG. 5A is an elevation view of housing 101a of the clutch assistant apparatus 100 of FIG. 1. FIG. 5B is an elevation view of the underside of cover plate 101b of the clutch assistant apparatus of FIG. 1. Referring now to FIG. 5A, clutch assistant housing 101a is depicted with cover plate 101b removed and depicted herein in FIG. 5B flipped 180 degrees. Referring now to FIG. 5A, clutch assistant housing 101a has a bottom and is open at the top. Bracket 115 includes a lateral annular opening that may be internally threaded for the cable adjustment stem of the secondary cable like cable 110 leading out to a clutch assembly.

Screws such as screws 112 of FIG. 1 are removed but the internally threaded seats are visible at approximately 0 degrees and 180 degrees (vertical). Material from housing 101a is removed within the footprint of bracket 115 to allow for mounting of the adjustment stem of the secondary cable (116, 111 respectively of FIG. 1). Bracket 115 may be strategically positioned within housing 101a and welded to the side wall of the housing. Clutch assistant housing 101a may have an opening placed there through adapted by internal threading or other means to accept the adjustment stem of the primary cable (117, 111 respectively of FIG. 1). Clutch assistant housing 101a may have a depth of approximately one inch to provide for enough clearance within housing 101a for unfettered operation of the unit.

Anchor plate 109b may be welded to the bottom wall of housing 101a. Anchor plate 109b may be strategically positioned within clutch assistant housing 101a at an angle of about 50 degrees from vertical. Referring now to FIG. 5B, anchor plate 109a may be welded to the underside surface of cover plate 101b in exact mirror image position such that they are aligned as a stack when cover plate 101b is placed over clutch assistant housing 101a and secured with screws. Clutch assistant housing 101a may have an opening placed there through adapted to allow for mounting of the adjustment stem of the primary cable leading to the clutch lever (117, 111 respectively of FIG. 1).

The embodiment depicted in FIGS. 1 through 5B supports Japanese motorcycle models including Yamaha™, Honda™, and Suzuki™. This embodiment also supports ATV models Polaris™, and Bombardier™.

Figure 6:
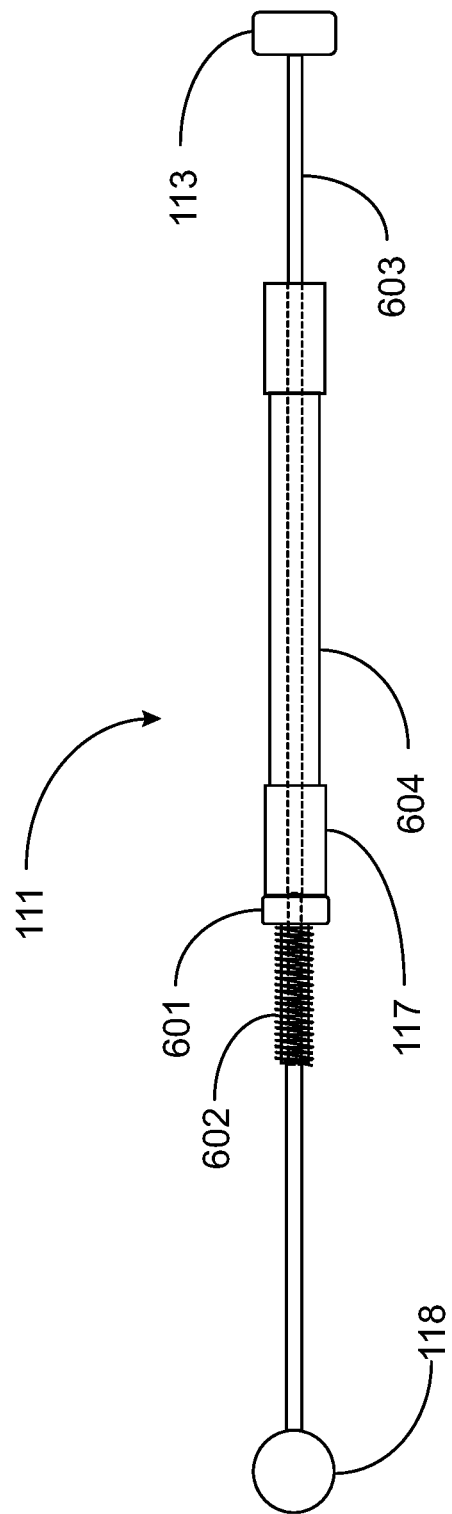
FIG. 6 is an elevation view of the primary clutch lever cable of the clutch assistant apparatus of FIG. 1.

FIG. 6 is an elevation view of primary clutch lever cable 111 of clutch assistant apparatus 100 of FIG. 1. Primary cable 111 includes a cable jacket 604 and a steel cable 603. The overall length of primary cable 111 is approximately eight and one-eighth of an inch (20.7 cm). Cable end 113 is a cylindrical disk oriented 90 degrees from cable end 118 at the opposite end of steel cable 603. Cable end 113 seats within the clutch lever (clutch lever 103, FIG. 1) and cable end 118 seats in the hook feature of the primary pivot plate stack 109a and 109b, FIG. 1).

Cable ends 118 and 113 may be similar or the same in diameter and thickness, for example, the outside diameter of cable end 118 or 113 may be about eleven thirty seconds of an inch (8.6 mm). The thickness dimension of cable ends 118 and 113 may be about five-sixteenth of an inch (7.8 mm). Cable adjustment nut 117 may include a jam nut and an externally threaded stem 602 that may be threaded into the opening provided through the wall of the clutch assistant housing (101a, FIG. 1). A cable jacket 604 may be about three and one-eight inches long (8 cm). Cable jacket 604 has two larger diameter steel jacket caps at both ends of the jacket, the caps measuring about nine sixteenths of an inch in length and about nineteen sixty-fourths of an inch in outside diameter (7.6 mm). It will be apparent to one with skill in the art that cable 111 may be longer or shorter without departing from the spirit and scope of the present invention. Moreover, the hardware may vary in dimension and the cable ends may vary in form and orientation without departing from the spirit and scope of the present invention.

Figure 7:
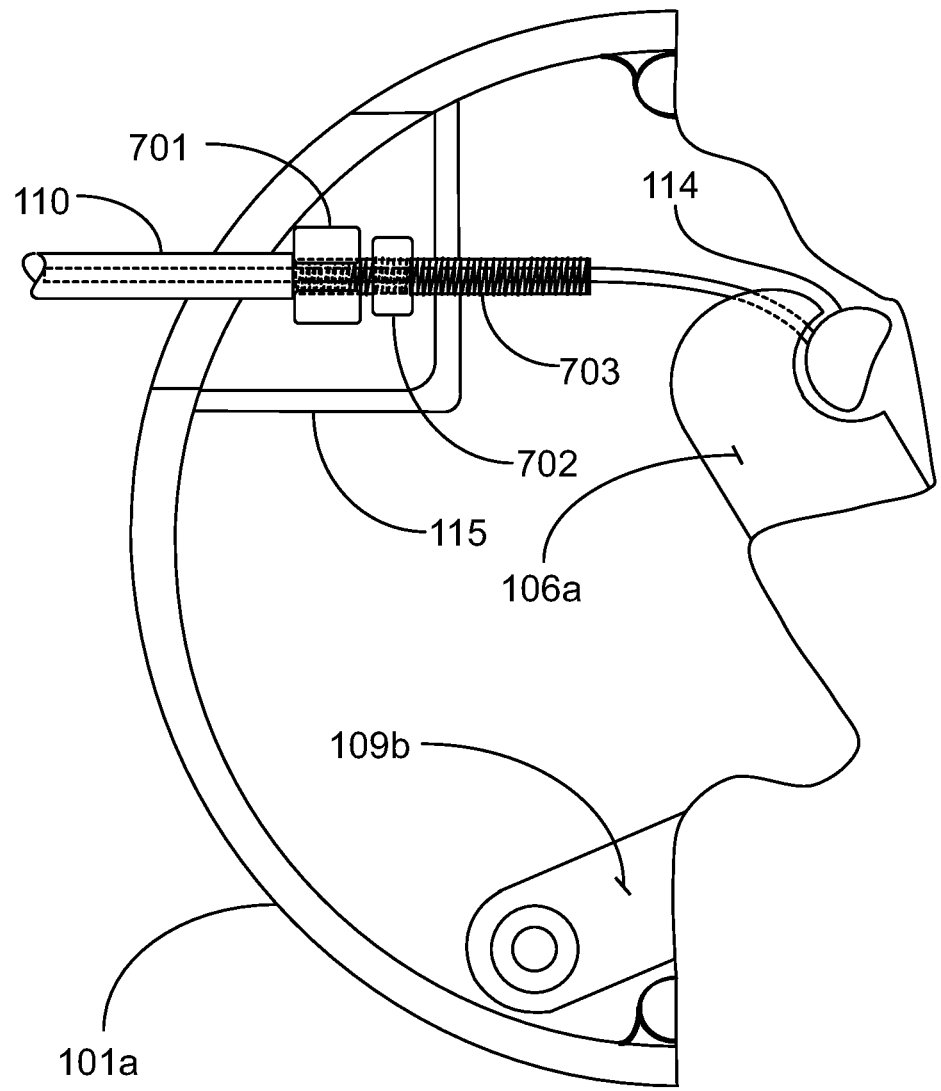
FIG. 7 is a partial enlarged view of the clutch assistant housing of the clutch assistant apparatus of FIG. 1 depicting the secondary cable interface.

FIG. 7 is a partial enlarged view of clutch assistant housing 101a of clutch assistant apparatus 100 of FIG. 1 depicting the secondary cable interface. Secondary cable 110 may be routed from clutch assistant housing 101a to the clutch assembly of the motorcycle or ATV. Cable 110 is referred to herein as a secondary cable because it is connected by cable end 114 to the hook feature of the secondary pivot plate stack of which plate 106a is partly depicted. In this embodiment, secondary cable 110 includes an adjustment nut 701 including a jam nut 702, and an externally threaded stem 703 that may be threaded through the central opening placed through bracket 115. Material may be removed from the sidewall of housing 101a from the top edge down to make room for secondary cable 110 to interface with the clutch assistant plate stack assembly (105, FIG. 1). Secondary cable 110 may be about two inches shorter than the stock version of the cable.

Empirical Data:

The inventor has tested the clutch assistant of the present invention on several models of Japanese motorcycles to quantify in pounds the reduction of force used at the clutch lever to obtain a full separation of a clutch plate from the clutch assembly via a cable pull method. The following data are results of empirical testing.

Kawasaki™ Kx100 model motorcycle original equipment manufacturer (OEM) data without clutch assistant has a clutch pull length of about 13 mm or one-half inch. At position of the index finger on the clutch lever, the force in pounds to pull the clutch is about 10 pounds whereas the force required to hold for release is about 6 pounds. At the very end of the clutch lever the pull force is about 6 pounds to pull and about 4 pounds required to hold for release. These levels of force required are constant across the pull length of 13 mm.

Kawasaki™ Kx100 model with the clutch assistant of the invention installed has a pull length reduced by 50 percent to 6.25 mm. At the position of the index finger on the clutch lever, the pull force graduates from 1 pounds to 8 pounds peaking at 3 mm distance then graduating back down to about 4 pounds by 6.25 mm distance. The force to hold the clutch is level at 1 pound across the distance. The force required to release begins at 3 pounds and graduates down to 1 pound at 6.5 mm distance.

At the very end of the clutch lever, the force in pounds required to pull graduates from 1 pounds to about 5 pounds peaking at 3 mm distance then graduating back down to 3 pounds by 6.5 mm distance. The force required to hold is less than a pound (8 oz) across the distance of 6.5 mm. Other Japanese models tested resulted in similar reductions in pull, hold, and release operations on the stock clutch levers with the clutch assistant installed between the lever and the clutch assemblies of those motorcycles.

Yamaha™ YZ250X model motorcycle original equipment manufacturer (OEM) data without clutch assistant has a clutch pull length of about 14 mm or just over one-half inch. At position of the index finger on the clutch lever, the force in pounds to pull the clutch is about 16 pounds whereas the force required to hold for release is about 8 pounds. At the very end of the clutch lever the pull force is about 10 pounds to pull and about 5 pounds required to hold for release. These levels of force required are constant across the pull length of 14 mm.

Yamaha™ YZ250X model with the clutch assistant of the invention installed has a pull length reduced by 50 percent to 7 mm. At the position of the index finger on the clutch lever, the pull force graduates from 1 pound to 10 pounds peaking at 3 mm distance then graduating back down to about 5 pounds by 7 mm distance. The force to hold the clutch is level at 1 pound across the distance. The force required to release begins at 3 pounds and graduates down to 1 pound at 7 mm distance.

At the very end of the clutch lever, the force in pounds required to pull graduates from 1 pound to about 7 pounds peaking at 3 mm distance then graduating back down to 1 pounds by 7 mm distance. The force required to hold is one pound (16 oz) across the distance of 7 mm. Other Japanese models tested resulted in similar reductions in pull, hold, and release operations on the stock clutch levers with the clutch assistant installed between the lever and the clutch assemblies of those motorcycles.

Figure 8:
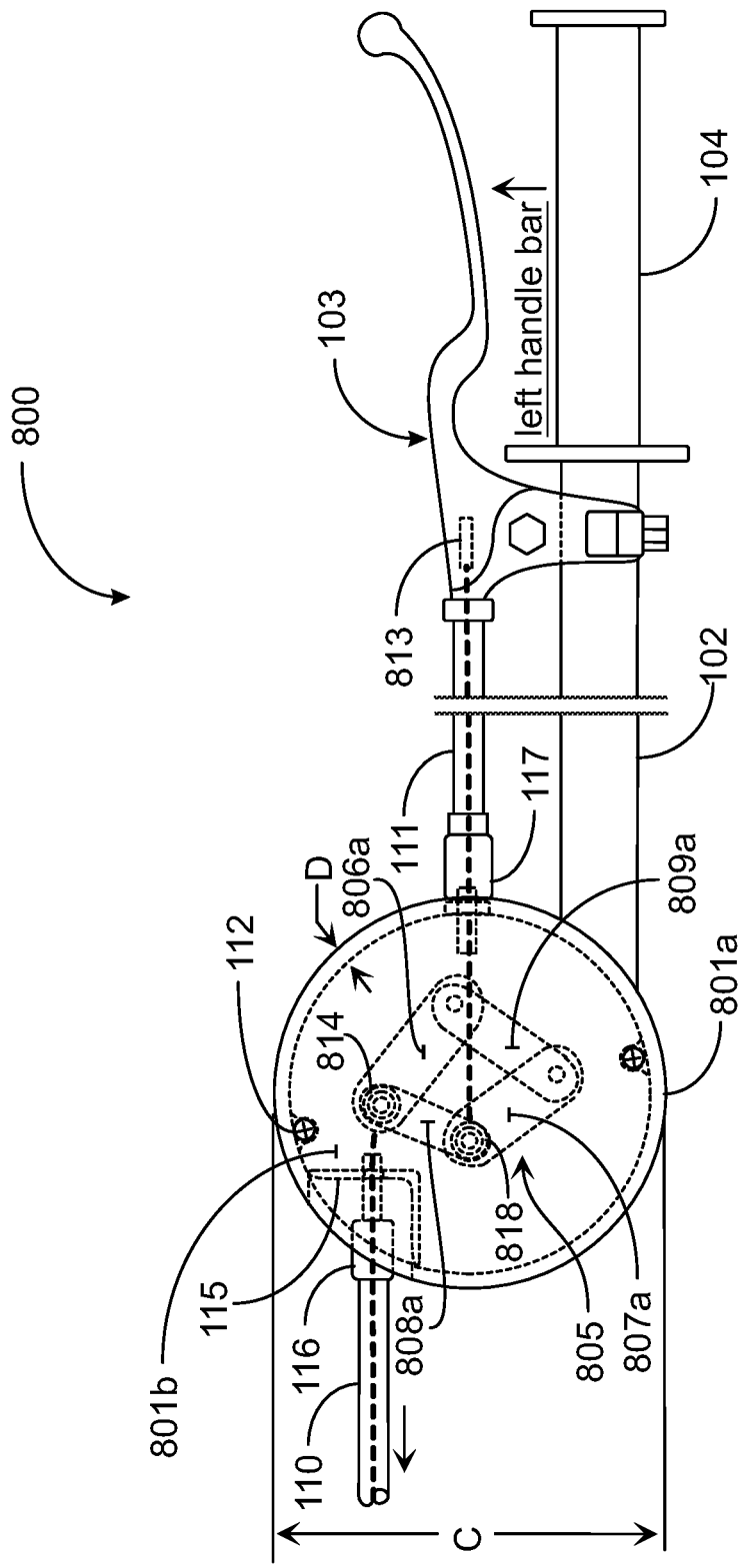
FIG. 8 is an elevation view of a clutch lever adapted with a pressure reducing clutch assistant apparatus according to another embodiment of the invention.

Harley Motorcycle Adaptation:

FIG. 8 is an elevation view of a pressure reducing clutch assistant apparatus 800 according to another embodiment of the invention. Clutch assistant 800 is similar to clutch assistant 100 described further above with respect to the discussion of FIG. 1 with a few modifications to accommodate stock components in a Harley Davidson™ model of motorcycle.

In this embodiment, clutch assistant 800 is installed on handlebar 102 in the same fashion or manner as other models using typical bar clamping hardware known in the art. Clutch assistant 800 includes a clutch assistant housing 801a analogous in form with housing 101a described further above relative to FIG. 1. Similarly, a clutch assistant cover plate 801b closes the open end of the housing form and may be installed using the same hardware screws 112. However, in this embodiment, the screw mounts are disposed at 165 degrees and at 350 degrees instead of at 180 degrees and zero degrees with the Japanese version of the clutch assistant 100 of FIG. 1.

Housing 801a has a depth dimension of approximately 1 inch (25 mm). Housing 801a may be approximately four inches in outside diameter with a wall thickness D of about one-hundred thousandths of an inch (2.5 mm). A pivot plate assembly 805 is provided in this embodiment and is slightly modified from pivot plate assembly 105 described relative to FIG. 1. In this embodiment, for example, primary and secondary pivot plates 807a and 807b (807b not visible) and secondary pivot plates 806a and 806b (806b not visible) are arranged in stacks analogous to those in assembly 105 described previously, however there is no hook feature to anchor cable ends. The pivot plate stacks 807a and 806a are anchored to a fixed anchor plate stack 809a and 809b (809b not visible). For discussion purposes the anchor plate stack will be referred to as stack 809a. In this implementation the cables, namely primary cable 111 and secondary cable 110 have ring or hoop cable ends as opposed to solid ends described above.

In this embodiment, primary cable 111 includes a ring end 813 anchored in clutch lever 103 and an opposite end ring 818 that is secured at the upper pivot point attachment of the primary pivot plate stack and idler arm plate stack 808a and 808b (808b not visible). Primary cable 111 in this embodiment is approximately eleven and five-eighths inches (25.9 cm) in overall length, about three inches longer than the counterpart in FIG. 1. Secondary cable 110 is modified from the counterpart in FIG. 1 with a hoop end 814, which is secured at the pivot point between the idler plate stack of 808a and 808b (808b not visible) and the secondary pivot plate stack 806a and 806b (806b not visible). Anchor plate stack is strategically located more toward center of housing 801a and at a sharper angle from the orientation of fixed anchor plates 109a and 109b of FIG. 1.

Primary cable 111 includes adjustment end nut 117 with externally threaded stem that may be threaded through an opening placed through the sidewall of housing 801a. Secondary cable 110 includes adjustment nut end 116 threaded through bracket 115 analogous to the embodiment of FIG. 1 with material removed from the sidewall of housing 801a to allow room for installation of the secondary cable to the housing. In this example, an anchor plate stack 809a and 809b (809b not visible) is provided to anchor pivot plate assembly 805 as was described further above relative to anchor plate stack including pivot plates 109a and 109b of FIG. 1. In this view, clutch assistant 800 is in a state of rest with clutch lever 103 fully raised and assembly 806 drawn toward the clutch assembly according to the direction of the arrow under secondary cable 110. To disengage the clutch assembly, the operator urges lever 103 downward toward handlebar grip 104 as described above relative to clutch assistant 100 of FIG. 1.

Figure 9:
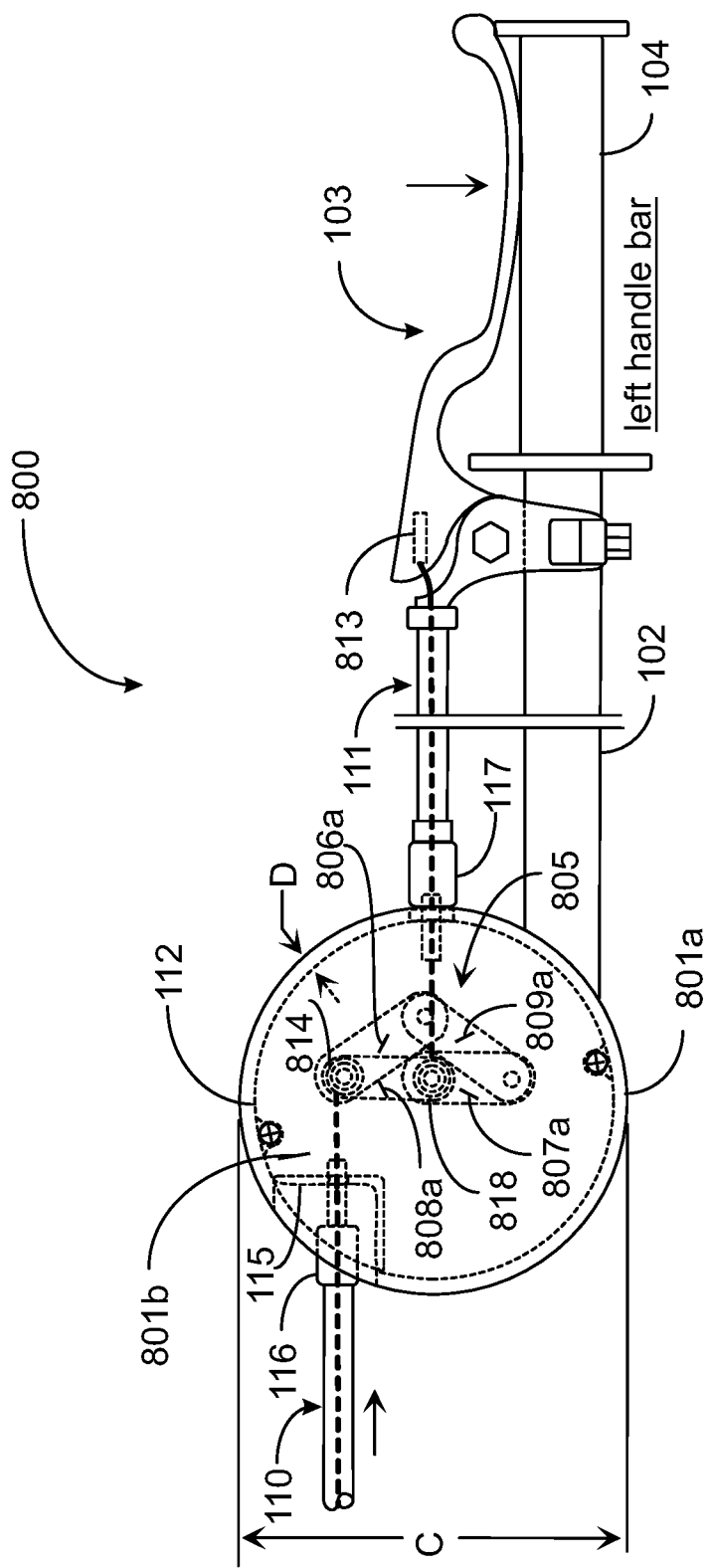
FIG. 9 is an elevation view of the clutch lever adapted with the pressure reducing clutch assistant apparatus of FIG. 8 in a clutch release position.

FIG. 9 is an elevation view of clutch assistant apparatus 800 of FIG. 8 in a clutch release or disengagement position. As was described with respect to clutch assistant 100 in FIG. 4 above, clutch assistant 800 is operated by clutch lever 103 to actuate disengagement, hold and release of the clutch assembly of the motorcycle. In this view, clutch lever 103 is urged downward toward handlebar grip 104 which pulls on the primary pivot stack characterized herein by element 801a and pivots the stack right along with idler plate stack 808a toward the left handle clutch lever 103 according to the direction of the arrow. The principle of force reduction at handle 103 in this embodiment is identical to the embodiment of FIG. 1.

Figure 10A:
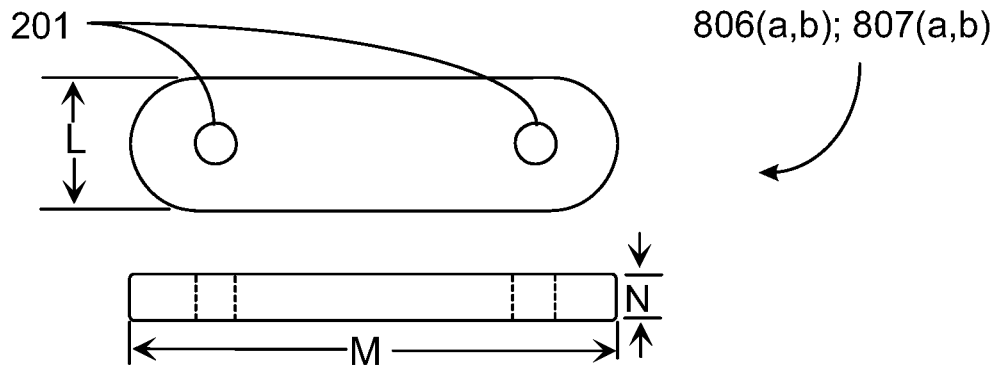
FIG. 10A is an overhead view and relative bottom edge view of the primary or secondary pivot plate of the clutch assistant apparatus of FIG. 8 according to an embodiment of the present invention.

FIG. 10A is an overhead view and relative bottom edge view of a primary or secondary pivot plate of clutch assistant apparatus 100 of FIG. 8 according to an embodiment of the present invention. The primary and secondary pivot plates are interchangeable parts and may be used as secondary plates 806a or 806b, or as primary plates 807a and 807b. There are two plates each stacked in two stacks or four plates total. For reference and discussion, the pivot plate will be characterized with element number 807a (primary plate). Pivot plate 807a has a width L of approximately three-quarters of an inch (19 mm).

Openings 201 are the same diameter as their counter parts depicted in FIG. 3. The hole diameter may be approximately 0.165 inches (4.2 mm). The hole spacing for holes 201 is about 1 inch and three-hundred thousandths of an inch (33.5 mm). The overall length M (in edge view) of pivot plate 807a is about 2 inches (51 mm). Plate 807a is rounded on both sides to a full radius. The uniform thickness dimension N of plate 807a is approximately 0.165 inches (2.7 mm) thick, which is the same thickness of the primary and secondary plates of FIG. 1. Plate 807a is fully rounded at each end.

Figure 10B:
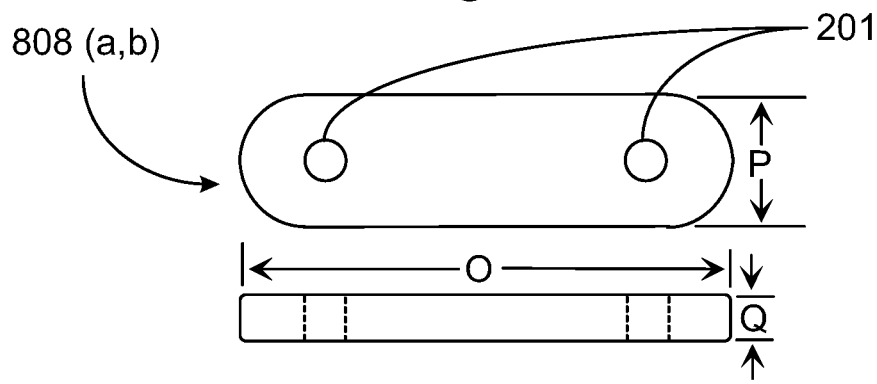
FIG. 10B is an overhead view and relative bottom edge view of the idler arm plate of the clutch assistant apparatus of FIG. 8.

FIG. 10B is an overhead view and relative bottom edge view of the idler arm plate of clutch assistant apparatus 800 of FIG. 8. The idler arm plate is characterized by element number 808a in this view for purpose of discussion. Plate 808a has a width dimension P of approximately 0.47 of an inch (12 mm). Plate 808a has an overall length dimension O of about 1.65 inches (42 mm). Plate 808a has a uniform thickness dimension Q of about 0.165 inches (2.7 mm) same as all of the other primary and secondary plates discussed. Idler plate has a spacing dimension between holes 201 of about 1.16 inches (29.5 mm.

Figure 10C:
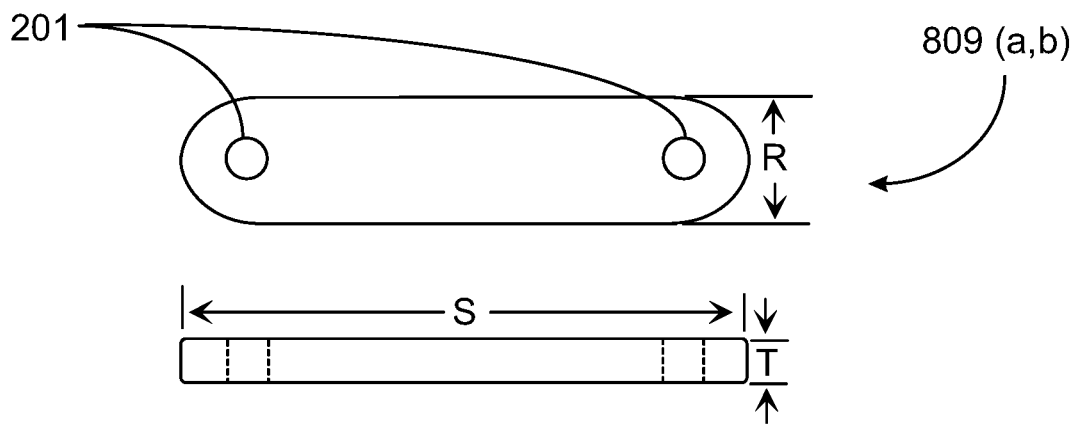
FIG. 10C is an overhead view and relative bottom edge view of the pivot anchor plate of the clutch assistant apparatus of FIG. 8.

FIG. 10C is an overhead view and relative bottom edge view of the pivot anchor plate of clutch assistant apparatus 800 of FIG. 8. The pivot anchor plates are in a preferred embodiment fixed one to the bottom wall of the clutch assistant housing and one to the underside of the cover plate. When assembled they align to form a plate stack. Anchor plate 809a or 809b has an overall width R of about 0.47 inches (12 mm). Anchor plate 809a has an overall length S of about 1.65 inches (42 mm).

In this embodiment, holes 201 are provided through plate 809a and 809b and are the same diameter (4.2 mm) to accept a pin of 4 mm in diameter. The pins and pin holes of both versions of the clutch assistant are the same in diameter. The spacing distance between hole 201 is approximately 1.16 inches (29.5 mm) from vertical centerline to vertical centerline. The individual plates depicted in FIGS. 10A through 10C are assemble in more or less the same basic configuration as was described with reference to pivot plate assembly 105. the invention is not limited by specific measurements herein provided in this document as lengths and widths, diameters etc. of components presented in the drawings may vary.

Referring now back to FIG. 3, pins 301 are not interchangeable between both versions of the clutch assistant. The pin shaft outside diameter is approximately five sixteenth of an inch (4 mm) while the diameter of holes 201 is approximately 0.165 inches (4.2 mm). The overall length of the shaft of pins 301 is different however for the Harley version of the clutch assistant. In pivot plate assembly 105, the pins are approximately eleven-sixteenth of an inch (17.4 mm) long. In pivot plate assembly 805 of FIG. 8 above pins 301 are about 24 mm in length. Both pin sets (Japanese and Harley) include an annular groove of about one-thirty-second of an inch (0.8 mm) wide extending around the pin shaft.

Another slight modification may be that the spacers 304 used for pivot plate assembly 105 are thinner than the same number of spacers employed in pivot plate assembly 805. Spacers 304 are 2.4 mm thick while the Harley version has spacers that are approximately 0.29 of an inch (7.2 mm) thick. The spacers used in pivot plate assembly 805 also have a slightly larger diameter approximately 0.408 inches (10.5 mm). Moreover, the inside diameter is approximately 4.2 mm rather than 5.2 mm cited as the ID of spacer 304. Anchor plate pins 302 of assembly 105 for the fixed anchor pivot points are straight pins five thirty seconds of an inch (4 mm) in diameter. Pins 302 for assembly 105 are (21 mm) while the same pins used in the Harley version are slightly longer at 25 mm.

Figure 11:
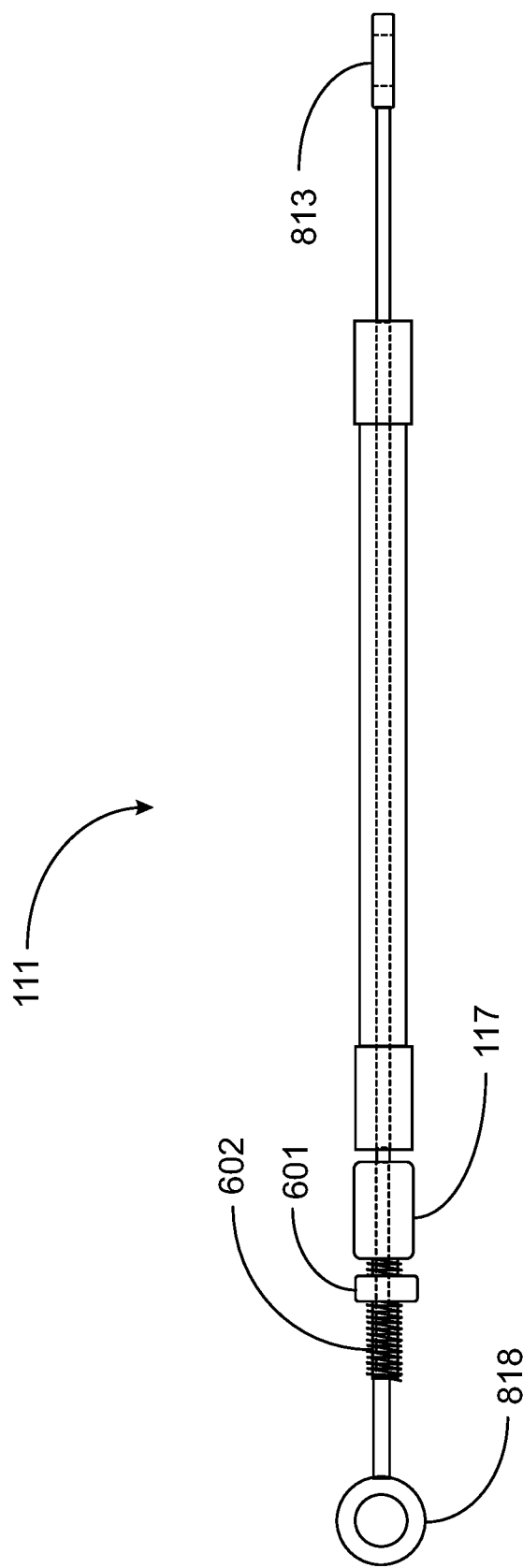
FIG. 11 is an elevation view of the primary clutch lever cable of the clutch assistant apparatus of FIG. 8.

FIG. 11 is an elevation view of primary clutch lever cable 111 of clutch assistant apparatus 800 of FIG. 8. Primary cable 111 for a Harley Davidson™ model is different from the primary cable of FIG. 6 due to a modification in the cable anchor ends 818 and 813 Cable end 818 and 813 are rings or hoops in this embodiment and fit over pins like pins 301 of FIG. 3. Cable end 813 is anchored within clutch lever 103 of FIG. 8 and is orientated laterally. Cable end 818 is sandwiched between the plates in the primary plate stack characterized by pivot plate 807a of FIG. 8 and is 90 degrees rotated vertically along the longitudinal axis thereof. Minor angular adjustments in the position of the clutch handle and in the mounted position of the clutch assistant may change the angular relationship between the cable ends to be greater than or less than a 90-degree rotation without departing from the spirit and scope of the present invention.

Cable ends 818 and 813 may be approximately 0.44 inches (11.4 mm) in inside diameter and may have an outside diameter greater than one-half inch (12.7 mm). In one embodiment, at least cable end 813 has a swivel attachment to the cable and may be secured at any angle relative to cable end 818 without creating twist in the cable. The steel cable (603, FIG. 6) may be about five-sixteenths of an inch (3 mm) in diameter for the Harley Davidson™ version of the cable, which is one millimeter larger than the steel cable used in the primary cable depicted in FIG. 6. Cable 111 is 11 and three-eighths inches long in the Harley Davidson™ version while the secondary cable is about four inches shorter. The primary cable includes a jacket and two steel jacket caps at both ends of the jacket. Adjustment nut 117 includes jam nut 601 and threaded stem 602, which are not modified other than having an inside hollow or diameter large enough to thread over the steel cable.

FIG. 12A is an elevation view of housing 801a of clutch assistant apparatus 800 of FIG. 8. FIG. 12B is an elevation view of the underside of cover plate 801b of clutch assistant apparatus 800 of FIG. 8. Referring now to FIG. 12A, anchor plate 809b is depicted fixed to the bottom of housing 801a for the Harley Davidson™ version of the clutch assistant 800 of FIG. 8. The position of anchor plate 809b is different from that of anchor plate 109b of FIG. 5AB, the position more toward the center portion of the housing and rotated to a larger angle from horizontal up to 50 degrees.

Referring now to FIG. 12B, anchor plate 809a is fixed to the underside of cover plate 801b as a mirror image positionally so that they align over inserted pins when cover plate 801b is assembled to housing 801a.

Empirical Data:

The inventor has tested the clutch assistant of the present invention on several models of Harley Davidson™ motorcycles to quantify in pounds the reduction of force used at the clutch lever to obtain a full separation of a clutch plate from the clutch assembly via a cable pull method. The following data are results of empirical testing.

Harley Davison™ 1200 sportster model motorcycle original equipment manufacturer (OEM) data without clutch assistant has a clutch pull length of about 18 mm or three-quarter inch. At position of the index finger on the clutch lever, the force in pounds to pull the clutch is about 28 pounds whereas the force required to hold for release is about 14 pounds. At the very end of the clutch lever the pull force is about 14 pounds to pull and about 8 pounds required to hold for release. These levels of force required are constant across the pull length of 18 mm.

Harley Davidson™ 1200 sportster model with the clutch assistant of the invention installed has a pull length reduced to 10 mm. At the position of the index finger on the clutch lever, the pull force graduates from 0 pounds to 22 pounds peaking at 5 mm distance then graduating back down to about 10 pounds by 10 mm distance. The force to hold the clutch is level at 13 ounces constant across the distance. The force required to release begins at 7 pounds and graduates down to ½ pound at 10 mm distance.

At the very end of the clutch lever, the force in pounds required to pull graduates from 0 pounds to about 11 pounds peaking at 5 mm distance then graduating back down to 4 pounds by 10 mm distance. The force required to hold is 5 oz constant across the distance of 10 mm. Other Harley Davidson™ models tested resulted in similar reductions in pull, hold, and release operations on the stock clutch levers with the clutch assistant installed between the lever and the clutch assemblies of those motorcycles.

It will be apparent with skill in the art that the motorcycle/ATV clutch assistant apparatus of the present invention may be provided using some or all the elements described herein.

The arrangement of elements and functionality thereof relative to the invention is described in different embodiments each of which is an implementation of the present invention. It is to be noted that many alterations could be made in the details of the construction and in the arrangement of the elements without departing from the spirit and scope of the present invention. The present invention is limited only by the breadth of the claims below.

The invention claimed is:

1. A clutch actuation force reducing apparatus comprising:
   an annular housing having a bottom wall, a sidewall, and a depth, the housing open at one end;
   an annular cover plate having a diameter and a plate thickness, the cover plate adapted to close the open end of the housing;
   a pair of anchor plates having a uniform length, a uniform width, and a uniform plate thickness, one anchor plate fixed to the bottom wall of the housing, the remaining anchor plate fixed to the underside of the cover plate, the anchor plates positionally aligned upon assembly of the cover plate to the housing;
   a pivot plate assembly including a first pair pivot plates and a second pair of pivot plates, the pivot plates having a uniform length, a uniform width, and a uniform plate thickness, the first pair of pivot plates connected to pivot to one end of the pair of anchor plates, the first pair of pivot plates having a cable connection to a first cable routed through the sidewall of the annular housing and connected to a clutch lever, the second pair of pivot plates connected to pivot to the remaining end of the pair of anchor plates, the second pair of pivot plates having a cable connection to a second cable routed through the sidewall of the annular housing and connected to a clutch actuator in turn connected to a clutch plate of a clutch basket assembly; and
   a pair of idler plates having a uniform length, a uniform width, and a uniform plate thickness, the idler plates connected to the first and second pair of pivot plates at the unanchored ends of the pivot plates, the idler plates adapted to control pivot motion of the first and second pair of pivot plates;
   characterized in that an operator may urge the clutch lever down to a handle grip to pull the first pair of pivot plates to initiate pivoting thereof about the connection at the pair of anchor plates, the pull force translated to the second pair of pivot plates over the pair of idler plates and dividing the stock pull force over the two pivot points at the pair of anchor plates to reduce the amount of physical force required at the clutch lever to actuate disengagement of an engaged clutch assembly.

2. The clutch actuation force reducing apparatus of claim 1, wherein the pivot points at the pair of anchor plates are vertical pins extending orthogonally through the anchor plates and through first and second pair of pivot plates respectively and retaining the pivot plates in an aligned stack at respective ends, the anchor plates sandwiching the ends of the first and second pair of pivot plates.

3. The clutch actuation force reducing apparatus of claim 2, wherein the pins are retained in the pivot assembly at the anchor plates by the bottom of the housing and the underside of the cover plate.

4. The clutch actuation force reducing apparatus of claim 1, wherein the pivot points at the pair of idler plates are vertical pins extending orthogonally through the idler plates and through the first and second pair of pivot plates respectively and retaining the pivot plates in an aligned stack at respective ends, the idler plates sandwiching the ends of the first and second pair of pivot plates.

5. The clutch actuation force reducing apparatus of claim 4, wherein the pins are retained in the pivot plate assembly at the cable interfacing ends of the pivot plate stacks with circle clips at least at the top end of the pins.

6. The clutch actuation force reducing apparatus of claim 4, wherein the first and second pair of pivot plates are spaced apart at the pivot points with a pair of annular spacers placed over the pins.

7. The clutch actuation force reducing apparatus of claim 4, wherein the first and second cable connections to the first and second pair of pivot plates respectively are annular rings having an outside diameter and an inside diameter and a ring thickness, the rings connected in-between each pair and over the vertical pins.

8. The clutch actuation force reducing apparatus of claim 1, wherein the first and second pair of pivot plates exhibit a hook feature on one side, the hook feature used to retain cylindrical cable ends of the first and second cables.

9. The clutch actuation force reducing apparatus of claim 1, wherein the cover plate is installed onto the housing with machine screws.

10. The clutch actuation force reducing apparatus of claim 1, wherein the anchor plates are fixed by welding them to the housing bottom wall and to the underside of the cover plate.

11. The clutch actuation force reducing apparatus of claim 1, wherein actuation of the clutch assembly is accomplished using a push rod to displace a clutch plate from a clutch basket.

* * * * *